United States Patent
Amano et al.

(10) Patent No.: US 7,426,192 B2
(45) Date of Patent: Sep. 16, 2008

(54) NETWORK CONFERENCE SYSTEM, CONFERENCE SERVER, RECORD SERVER, AND CONFERENCE TERMINAL

(75) Inventors: Mitsuyoshi Amano, Tokyo (JP); Hironori Nagayama, Tokyo (JP); Keiji Suginohara, Tokyo (JP)

(73) Assignee: Pioneer Corporation, Tokyo (JP)

( * ) Notice: Subject to any disclaimer, the term of this patent is extended or adjusted under 35 U.S.C. 154(b) by 629 days.

(21) Appl. No.: 11/064,842

(22) Filed: Feb. 25, 2005

(65) Prior Publication Data

US 2005/0216549 A1    Sep. 29, 2005

(30) Foreign Application Priority Data

Feb. 25, 2004 (JP) ............ P2004-050551

(51) Int. Cl.
| | |
|---|---|
| H04L 12/16 | (2006.01) |
| H04Q 11/00 | (2006.01) |
| H04B 3/30 | (2006.01) |
| H04L 12/28 | (2006.01) |
| H04L 12/56 | (2006.01) |
| H04M 3/42 | (2006.01) |
| G06F 15/16 | (2006.01) |

(52) U.S. Cl. ............ 370/261; 370/260; 370/271; 370/285; 370/400; 370/401; 370/402; 455/416; 709/203

(58) Field of Classification Search ............ None
See application file for complete search history.

(56) References Cited

U.S. PATENT DOCUMENTS 4,736,407 A * 4/1988 Dumas ............ 379/93.21
2005/0053214 A1* 3/2005 Reding et al. ........ 379/202.01

FOREIGN PATENT DOCUMENTS

| JP | 6-205151 A | 7/1994 |
|---|---|---|
| JP | 10-294798 A | 11/1998 |

* cited by examiner

*Primary Examiner*—Edan Orgad
*Assistant Examiner*—Blanche Wong
(74) *Attorney, Agent, or Firm*—Sughrue Mion, PLLC (57) ABSTRACT

In addition to a conference server 100, a record server 200 is provided. The conference data of a real-time conference is stored in a storage section 214 of the record server 200 (S2). A conference terminal 300a performs connection processing to the conference (S1) and then transmits a catch-up playback request to the record server 200 (S3). The record server 200 determines whether or not catch-up playback is enabled (S4) and then distributes the past conference data (S6), and notifies the conference terminal 300a that the catch-up playback end point has come (S7-1). Accordingly, the connection of the conference terminal 300a is switched to the conference server 100 (S9) and the conference terminal 300a is connected to the real-time conference (S10).

12 Claims, 4 Drawing Sheets

NETWORK CONFERENCE SYSTEM, CONFERENCE SERVER, RECORD SERVER, AND CONFERENCE TERMINAL

The present disclosure relates to the subject matter contained in Japanese Patent Application No. 2004-050551 filed on Feb. 25, 2004, which is incorporated herein by reference in its entirety.

BACKGROUND OF THE INVENTION

1. Field of the Invention

The present invention relates to a network conference system, a conference server, a record server, and a conference terminal.

2. Description of the Related Art

To execute a teleconference through a network, first a conference reservation is made and when the conference start time is reached, each conference participant enters the password distributed at the reservation time. Accordingly, the conference terminals of the participants are connected to the real-time conference. A participant late for the conference can take part in the conference as the participant gets permission to take part in the conference from the chairperson.

Arts for making it possible to record the conference description and later reference the conference description are described in JP-A-10-294798 and in JP-A-6-205151.

The art described in JP-A-10-294798 relates to a creation method of multimedia minutes, wherein a digital watermarking technology is used to embed information identifying the speaker in statement information (audio information) of the participant so that the speaker cannot later deny the statement in the conference.

In the art described in JP-A-6-205151, audio and video information of the conference (containing information indicating the proceedings of the conference) is recorded and can be played back later.

SUMMARY OF THE INVENTION

In network conference systems in related arts, if a late-joining participant takes part directly in the current proceeding conference, the participant cannot keep track of the proceedings from the conference start to the current point in time and therefore it becomes difficult for the participant to actively take part in the conference.

According to the arts described in JP-A-10-294798 and in JP-A-6-205151, the minutes of a conference are created and can be referenced after the conference is over.

However, the arts do not consider that a late-joining participant (user who attempts to take part in the current proceeding conference) is allowed to use the minutes. Consequently, the late-joining participant can only check the conference description before the point in time at which the participant took part in the conference on the minutes after the conference is over.

Therefore, the participant late for the current proceeding conference still cannot keep track of the proceedings preceding the point in time at which the participant took part in the conference. The late-joining participant is at a disadvantage as compared with other participants and the arts described in JP-A-10-294798 and in JP-A-6-205151 do not provide any improvements on this point.

It is also considered that the conference start condition is that the participants be all present, in which case the conference cannot be started as scheduled and the time is wasted.

It is of objects of the invention to enable a late-joining user to keep track of the past conference description without hindering the progress of a real-time conference for providing a network conference system improved in ease of use.

According to a first aspect of the invention, there is provided a network conference system including: a conference server that manages a conference and processes conference data used for a real-time conference; a record server that stores the conference data and plays back the stored conference data at variable speed; and a plurality of conference terminals as clients connected to the conference server and the record server to be serviced therefrom, wherein each of the conference terminals connects to the record server and receives distribution from the record server of the past conference data in the real-time conference played back at a speed of at least one of a high speed, a low speed and a uniform speed.

According to a second aspect of the invention, there is provided a network conference system including: a conference server that manages a conference and processes conference data used for a real-time conference; a record server that stores the conference data in a storage section and plays back the conference data stored in the storage section at variable speed; and a plurality of conference terminals as clients connected to the conference server and the record server to be serviced therefrom, wherein the network conference system having a catch-up participation function in which when one of the plurality of conference terminals takes part in a conference midway, the conference terminal is connected to the record server, the past conference data stored in the record server is played back at high speed until the conference terminal catches up with the current conference, and when the conference terminal catches up with the current conference, the conference terminal is connected to the conference server for taking part in the real-time conference, wherein the conference server adds a time stamp to the conference data and transmits the conference data to the record server, wherein the record server stores the conference data transmitted from the conference server and upon reception of a catch-up participation request from the conference terminal, determines whether or not the catch-up participation is enabled, plays back the stored conference data at high speed, transmits the conference data to the conference terminal, determines an end point of catch-up playback by comparing the time stamp contained in the conference data and the current time of day, and when the end point comes, notifies the conference terminal and the conference server that the catch-up playback reaches the end, and wherein the conference terminal, upon reception of the notification that the end point of the catch-up playback is received from the record server, switches the connection from the record server to the conference server and takes part in the real-time conference.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Referring now to the accompanying drawings, there are shown preferred embodiments of the invention.

First Embodiment

Figure 1:
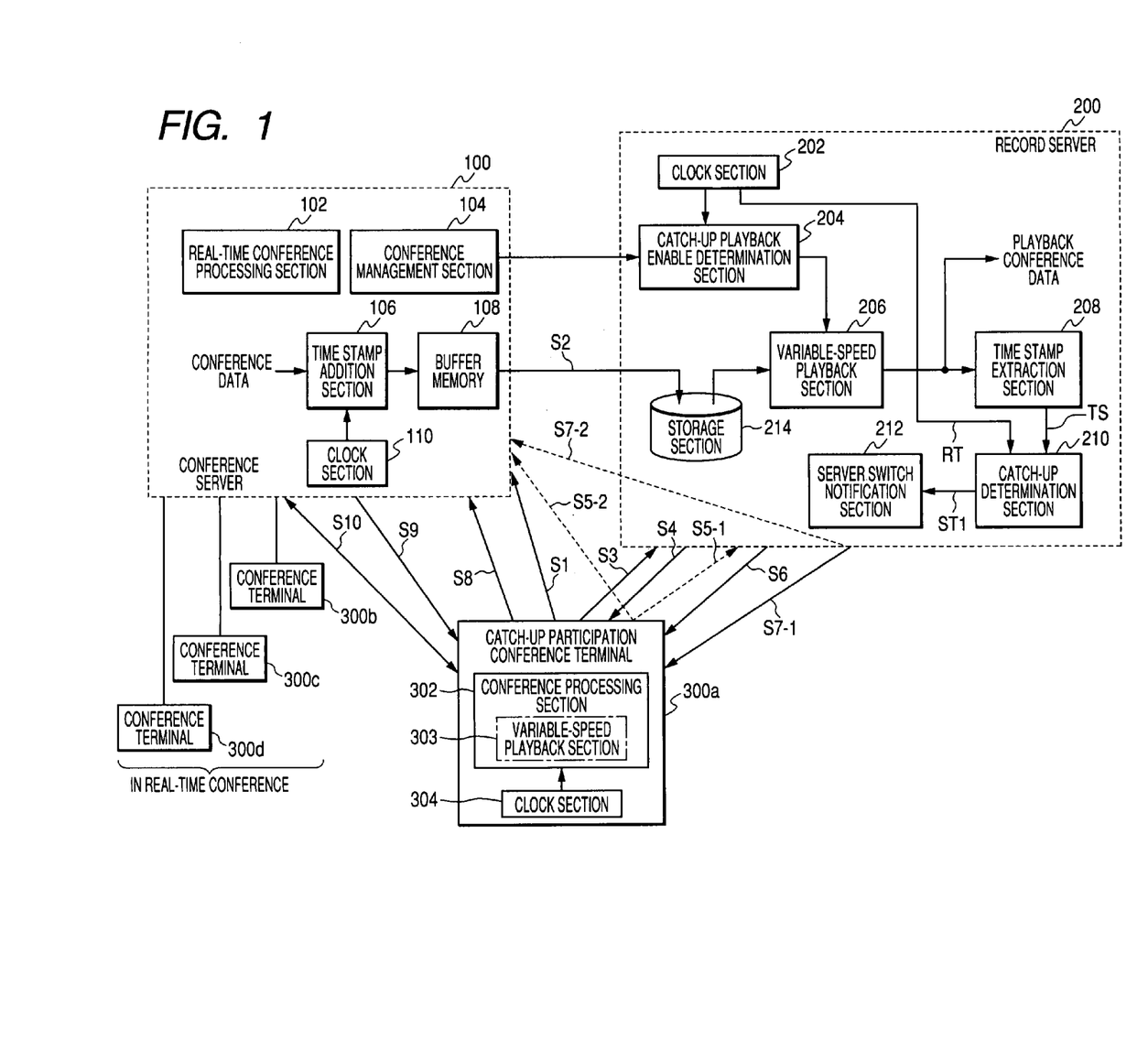
FIG. 1 is a drawing to describe the main procedure for executing catch-up participation in a network conference system according to a first embodiment of the invention and the characteristic configurations of a conference server, a record server, and conference terminals making up the network conference system.

FIG. 1 is a drawing to describe the main procedure for executing catch-up participation (catch-up playback and transition from catch-up playback to real-time conference) in a network conference system of the invention and the characteristic configurations of a conference server, a record server, and conference terminals making up the network conference system.

As shown in the figure, the network conference system is made up of a conference server 100, a record server 200, and a plurality of conference terminals 300a to 300d.

The conference terminal 300a is a conference terminal for a late-joining user (catch-up participation conference terminal), and the conference terminals 300b to 300d are conference terminals in a real-time conference. The conference terminals 300a to 300d have the same configuration. FIG. 1 shows only the characteristic configuration of the conference terminal 300a.

The conference server 100 includes a real-time conference processing section 102 for supporting a real-time conference, a conference management section 104 for performing conference reservation processing, authentication processing, etc., a time stamp addition section 106, buffer memory 108, and a clock section 110.

The record server 200 includes a clock section 202, a catch-up playback enable determination section 204, a variable-speed playback section 206, a time stamp extraction section 208, a catch-up determination section 210, a server switch notification section 212, and a storage section (hard disk, etc.,) 214 for storing the conference data of a real-time conference.

The catch-up participation conference terminal 300a transfers information to and from the conference server 100 and the record server 200 as required. The conference server 100, the record server 200, and the catch-up participation conference terminal 300a operate in conjunction with each other, thereby accomplishing catch-up participation (catch-up playback and transition from catch-up playback to real-time conference).

The steps for making a conference reservation, starting a real-time conference, and achieving catch-up participation will be discussed below:

In FIG. 1, symbols S1 to S10 are assigned to the steps.

The user of the conference terminal 300a who wants to take part in (to join in) the conference connects to the conference server 100 using a Web browser and accesses the conference management section 104 for making a conference reservation (S1).

When the conference schedule time is reached, the promoter of the conference and the conference participants connect to the conference server from the their respective conference terminals and enter the password distributed when the conference reservation was made. Accordingly, the conference client application of each conference terminal is started, connecting the conference terminal to the scheduled conference.

If a latecomer exists among the conference participants, the real-time conference is started according to schedule. The conference server 100 gives a time stamp (information indicating the current time of day) to the conference data of the real-time conference by the time stamp addition section 106 and delays the conference data in the buffer memory 108 for a predetermined time and then transmits the conference data to the record server 200 (S2).

The record server 200 stores the sent conference data in the storage section (hard disk, etc.,) 214.

When the promoter of the conference connects to the conference server 100, conference data record in the record server 200 is started.

The participant late for the conference (the user of the catch-up participation conference terminal 300a) references a conference list using the Web browser and checks the conference in which the participant should take part. At this time, it is desirable that the participant should be able to check the elapsed time since the start of the current proceeding conference on the conference list.

If the late-joining user wants catch-up participation (if the participant determines that catch-up participation is enabled), the participant enters the previously distributed password from his or her conference terminal 300a and subsequently selects catch-up participation connection from among participation mode options displayed on a display (see FIG. 4).

Accordingly, the conference client application is started, connecting the conference terminal 300a to the record server 200 (S3).

The catch-up playback enable determination section 204 of the record server 200 determines whether or not catch-up playback is enabled. That is, even if the user of the conference terminal 300a determines that catch-up playback is enabled, if precise calculation is executed, it is possible that catch-up playback will not complete before the conference is over or the remaining time of the conference at the completion time of catch-up playback is extremely short and the catch-up playback is not much significant if it is executed. Therefore, the record server 200 determines whether or not catch-up playback is enabled before the catch-up playback is executed.

When the catch-up playback enable determination section 204 determines whether or not catch-up participation is enabled, the catch-up playback enable determination section 204 estimates the remaining time of the conference at the completion time of the catch-up playback from the remaining time of the conference at the current point in time and the time required by the time the catch-up playback is complete (for example, the time required if the catch-up playback is executed at the highest speed). When the remaining time is equal to or greater than a predetermined time, the catch-up playback enable determination section 204 determines that catch-up participation is enabled.

The record server 200 sends the determination result as to whether or not catch-up participation is enabled to the conference terminal 300a (S4). At this time, the record server 200 may also send information of the completion schedule time of the catch-up playback for displaying the schedule time on the display of the conference terminal 300a, attracting the attention of the user.

Upon reception of the notification that the catch-up playback is enabled, the conference terminal 300a transmits a high-speed playback (catch-up playback) request to the record server 200 (S5-1). At this time, the playback speed may be specified from the conference terminal 300a. Alternatively, it may be made possible to give an instruction for playback by chapter specification or playback every predetermined time interval (digest playback).

On the other hand, upon reception of the notification that the catch-up playback is not enabled, the conference terminal 300a abandons the catch-up playback and is given two options of selecting follow-up playback (playback mode of only viewing the past conference data as an observer) and taking part directly in the real-time conference.

When follow-up playback is selected, a follow-up playback request is transmitted from the conference terminal 300a to the record server 200 (S5-1). When the option of taking part directly in the real-time conference is selected, a request for taking part directly in the real-time conference is transmitted to the record server 200 (S5-2)

To the conference terminal 300a receiving the notification that the catch-up playback is enabled at S4, subsequently, high-speed played-back conference data is distributed from the record server 200 (S6).

That is, the variable-speed playback section 206 of the record server 200 plays back the conference data at high speed from the storage section (hard disk, etc.,) 214. The played-back conference data is transmitted to the conference terminal 300a. The user of the conference terminal 300a views the past conference using the display and a loudspeaker.

The conference terminal 300a includes a variable-speed playback section 303 for receiving the conference data transmitted from the record server 200 and playing back the conference data. At the high-speed playback time, the variable-speed playback section 303 can play back the conference data with the no-input state of audio skipped, can play back the portion determined not important by the user of the conference terminal 300a at increased playback speed, or can play back the conference data for a given time at a chapter point or play back the conference data every predetermined time interval (digest playback with still images), thereby executing efficient playback.

While executing the high-speed playback of the conference data, the record server 200 determines the end point of the high-speed playback (namely, catch-up with the current time) (catch-up determination).

The catch-up determination section 210 of the record server 200 makes the catch-up determination. The catch-up determination procedure is as follows:

The time stamp extraction section 208 extracts a time stamp from the played-back conference data. The catch-up determination section 210 makes a comparison between current time information (RT) output by the clock section 202 and the time stamp (TS) extracted by the time stamp extraction section 208.

When the conference data is sent from the conference server 100 to the record server 200, a predetermined-time (for example, 15 second) delay occurs in the buffer memory 108 as described above. Therefore, the most recent conference data that can be played back in the record server 200 is the conference data the predetermined time (for example, 15 seconds) before the current time.

That is, when the time stamp (ST) of the catch-up played-back conference data indicates the predetermined time (for example, 15 seconds) before the current time, the most recent conference data has been played back and at this point in time, it can be determined that the catch-up playback is complete. The catch-up determination section 210 thus makes the catch-up determination.

When the catch-up determination section 210 detects the catch-up playback reaching the end point, the server switch notification section 212 notifies both the conference terminal 300a and the conference server 100 that the catch-up playback has reached the end (S7-1 and S7-2)

Upon reception of the notification, the conference terminal 300a transmits a server switch request (namely, a request for switching the connection from the record server 200 to the conference server 100) to the conference server 100 (S8).

The conference server 100 temporarily halts the real-time conference (namely, inhibits writing of new conference data into the buffer memory 108) and transmits the conference data for the predetermined time (for example, 15 seconds) stored in the buffer memory 108 to the conference terminal 300a (S9).

Upon completion of the transmission, the conference server 100 releases the temporary halt state (locked state) of the real-time conference and starts to distribute the real-time conference data to the conference terminals 300a (300b, 300c, and 300d). Then, connection of the late-joining participant to the real-time conference is accomplished (S10).

In this example, when the conference terminal 300a switches the connection from the record server 200 to the conference server 100, the conference server 100 temporarily halts (locks) the real-time conference.

However, seamless change of the connection (connection of the late-joining participant to the real-time conference) can also be made without producing the temporary halt state (locked state).

In this case, catch-up playback is executed still after the connection is switched to the conference server 100, and the speed of the catch-up playback is varied with time.

That is, the catch-up playback (namely, high-speed read of the conference data stored in the buffer memory 108) is executed still after the catch-up playback in the record server 200 is complete and the conference terminal 300a switches the connection to the conference server 100, and the speed of the catch-up playback (high-speed read of the buffer memory 108) is decreased gradually with a lapse of time.

While the conference data for the predetermined time (for example, 15 seconds) stored in the buffer memory 108 is transmitted, the real-time conference also proceeds and new conference data is also stored in the buffer memory 108.

The playback speed (namely, the data read speed from the buffer memory 108) is controlled so that high-speed playback is complete and uniform-speed playback is executed upon completion of the transmission of the conference data for the predetermined time (for example, 15 seconds) and transmission of the conference data occurring during the transmission of the conference data for the predetermined time, and a smooth transition is made to distribution of the real-time conference data, so that seamless connection to the real-time conference is accomplished.

Thus, according to the embodiment, it is made possible for the late-joining user to keep track of the past conference description without hindering the progress of the real-time conference, and the network conference system which is more convenient and is improved in ease of use can be provided.

Whether or not catch-up participation is enabled can be determined not only by the record server, but also by a Web server, etc., on the network. If catch-up with the real-time conference is not achieved, it becomes the same as follow-up attendance and therefore determination may be made only by the user's judgment.

Second Embodiment

In a second embodiment of the invention, the configuration and the operation of a network conference system will be discussed more specifically.

Figure 2:
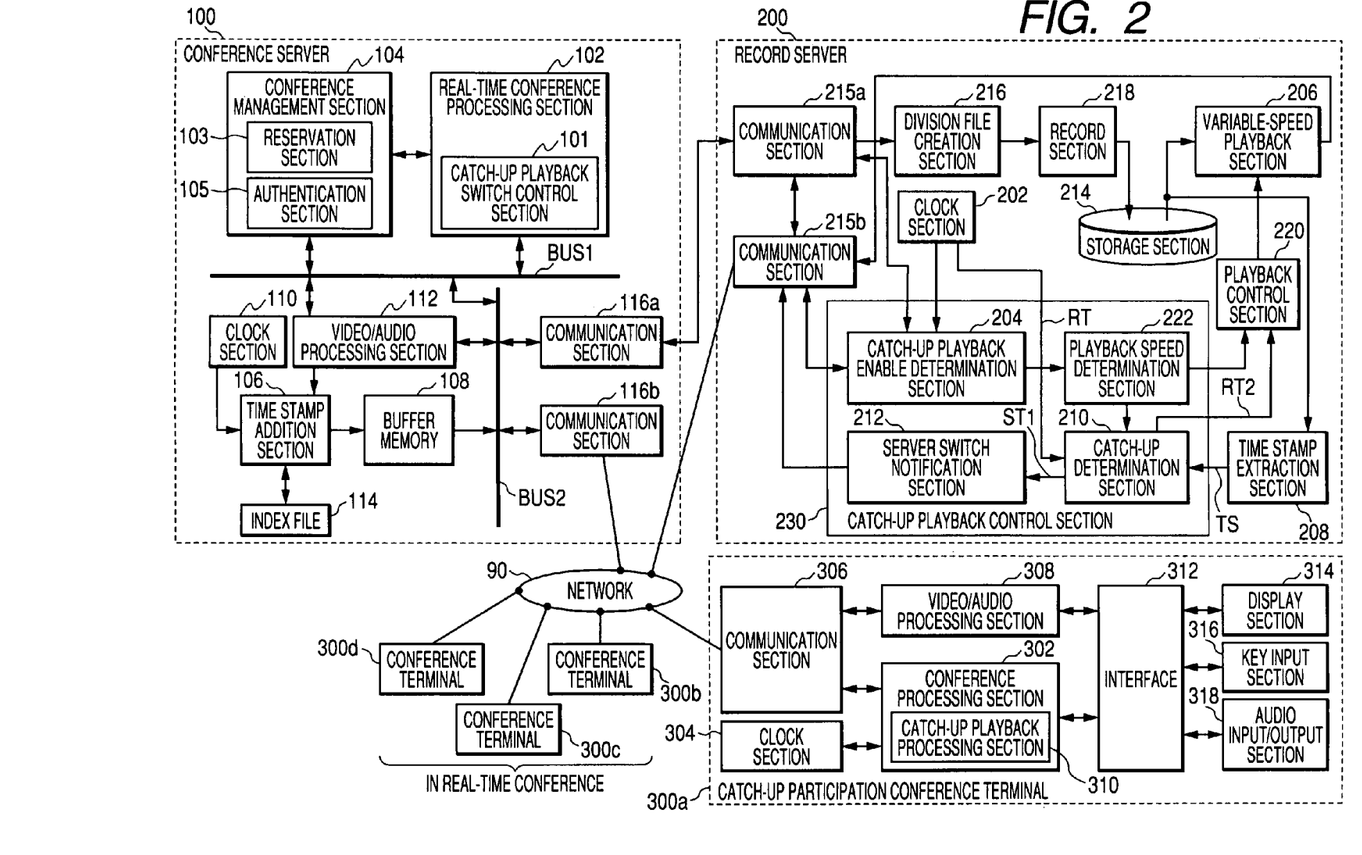
FIG. 2 is a block diagram to show the specific configuration of a network conference system according to a second embodiment of the invention.

FIG. 2 is a block diagram to show the specific configuration of a network conference system of the invention.

The network conference system shown in FIG. 2 is provided by embodying the configuration of the network conference system in FIG. 1, and the characteristic configuration and operation of the network conference system in FIG. 2 are the same as those in FIG. 1. Parts identical with those previously described with reference to FIG. 1 are denoted by the same reference numerals in FIG. 2.

In FIG. 2, conference terminals 300a to 300d have the same configuration and can connect to a conference server 100 and a record server 200 through a network 90 for receiving distribution of data.

Here, the conference terminal 300a is a conference terminal for a late-joining user (namely, catch-up participation conference terminal) and the conference terminals 300b to 300d are conference terminals for the participants in the real-time conference.

The conference terminal 300a includes a communication section 306, a conference processing section 302 (having a catch-up playback processing section 310), a clock section 304, a video/audio processing section 308, an input/output interface 312, a display section (liquid crystal display, etc.,) 314, a key operation section (also containing a mouse for operating a point cursor, etc.,) 316, and a audio input/output section 318.

The conference processing section 302 executes connection processing to the conference server 100 and the record server 200 and processing of transferring control information to and from the servers.

The catch-up playback processing section 310 receives distribution of high-speed played-back conference data from the record server 200 and upon completion of catch-up playback, switches the connection from the record server 200 to the conference server 100.

The conference server 100 includes a real-time conference processing section 102, a conference management section 104, a time stamp addition section 106, buffer memory 108, a clock section 110, a video/audio processing section 112, an index file 114, and communication sections 116a and 116b.

The sections can transfer data and a control signal to and from each other via buses (BUS1 and BUS2).

The conference management section 104 includes a reservation section 103 in charge of conference reservation processing and an authentication section 105 for authenticating the conference participants using a password.

The real-time conference processing section 102 includes a catch-up playback switch control section 101.

When the conference terminal 300a switches the connection from the record server 200 to the conference server 100, the catch-up playback switch control section 101 temporarily halts the progress of the real-time conference and meanwhile transmits the conference data retained in the buffer memory 108 to the conference terminal 300a or controls the data read speed from the buffer memory 108 with a lapse of time for accomplishing seamless switching.

The time stamp addition section 106 references the current time information output from the clock section 110 and adds a time stamp (information indicating the time of day) to the real-time conference data output from the video/audio processing section 112.

The index file 114 is a file for managing information of the time stamps in a unified manner.

The communication section 116a is in charge of communications with the record server 200 and the communication section 116b is in charge of communications with the conference terminals 300a to 300d.

The record server 200 includes communication sections 215a and 215b, a division file creation section 216, a record section 218, a storage section (hard disk, etc.,) 214 for storing conference data, a variable-speed playback section 206, a playback control section 220 for controlling the playback speed, a time stamp extraction section 208, and a catch-up playback control section 230.

The division file creation section 216 divides the conference data recorded in the storage section (hard disk, etc.,) 214 every predetermined data amount.

That is, the record server 200 needs to store (write) and play back (read) the conference data at the same time; however, if the data amount in one file is enormous, it takes time in opening and closing the file, the data input/output load grows, and it is feared that real-time processing will be hindered. Then, the conference data is divided every predetermined data amount, lessening the data input/output load.

The conference data of a real-time conference may contain various pieces of multimedia data and if a long-duration conference is conducted, the file size for the conference becomes enormous. Also in this case, if the file is divided every given data amount and data is input/output (read/written) in units of the division files, the disk seek time may be a short time and the real-time processing is not delayed.

The catch-up playback control section 230 in the record server 200 includes a catch-up playback enable determination section 204, a playback speed determination section 222, a catch-up determination section 210, and a server switch notification section 212.

The catch-up playback control section 230 executes processing concerning steps S4, S6, S7-1, and S7-2 shown in FIG. 1.

That is, if a late-joining user issues a catch-up playback request from the conference terminal, the catch-up playback enable determination section 204 determines whether or not catch-up playback is enabled.

That is, the catch-up playback enable determination section 204 estimates the remaining time of the conference at the completion time of the catch-up playback from the remaining time of the conference at the current point in time and the time required by the time the catch-up playback is complete (for example, the time required if the catch-up playback is executed at the highest speed). When the remaining time is equal to or greater than a predetermined time, the catch-up playback enable determination section 204 determines that catch-up participation is enabled.

The playback speed determination section 222 (not shown in FIG. 1) determines the playback speed. For example, if the user of the conference terminal 300a makes a request for terminating catch-up playback in five minutes, the playback speed determination section 222 determines appropriate playback speed and notifies the playback control section 220 of the determined playback speed.

The catch-up determination section 210 makes a comparison between current time information (RT) output by the clock section 202 and the time stamp (TS) extracted by the time stamp extraction section 208.

When the conference data is sent from the conference server 100 to the record server 200, a predetermined-time delay occurs in the buffer memory 108 as described above. Thus, the most recent conference data that can be played back in the record server 200 is the conference data the predetermined time before the current time. Therefore, when the time stamp (TS) of the catch-up played-back conference data indicates the predetermined time before the current time, the most recent conference data has been played back and at this point in time, it can be determined that the catch-up playback is complete. The catch-up determination section 210 thus makes the catch-up determination.

When the catch-up determination section 210 detects the catch-up playback reaching the end point, the server switch notification section 212 notifies both the conference terminal 300a and the conference server 100 that the catch-up playback has reached the end (S7-1 and S7-2 in FIG. 1).

Upon reception of the notification, the conference terminal 300a transmits a server switch request (namely, a request for switching the connection from the record server 200 to the conference server 100) to the conference server 100 (S8 in FIG. 1).

The catch-up playback switch control section 101 in the conference server 100 temporarily halts the real-time conference (namely, inhibits writing of new conference data into the buffer memory 108) and transmits the conference data for the predetermined time stored in the buffer memory 108 to the conference terminal 300a (S9 in FIG. 1). Upon completion of the transmission, the catch-up playback switch control section 101 releases the temporary halt state (locked state) of the real-time conference and starts to distribute the real-time conference data to the conference terminal 300a. Then, connection of the late-joining participant to the real-time conference is accomplished (S10 in FIG. 1).

The catch-up playback is executed still after the catch-up playback switch control section 101 in the conference server 100 switches the connection of the conference terminal 300a to the conference server 100, and the speed of the catch-up playback is varied with time, so that a smooth transition is made to distribution of the real-time conference data, so that seamless change of the connection (namely, connection of the late-joining participant to the real-time conference) can also be accomplished without causing the real-time conference to be temporarily halted (locked).

Figure 3:
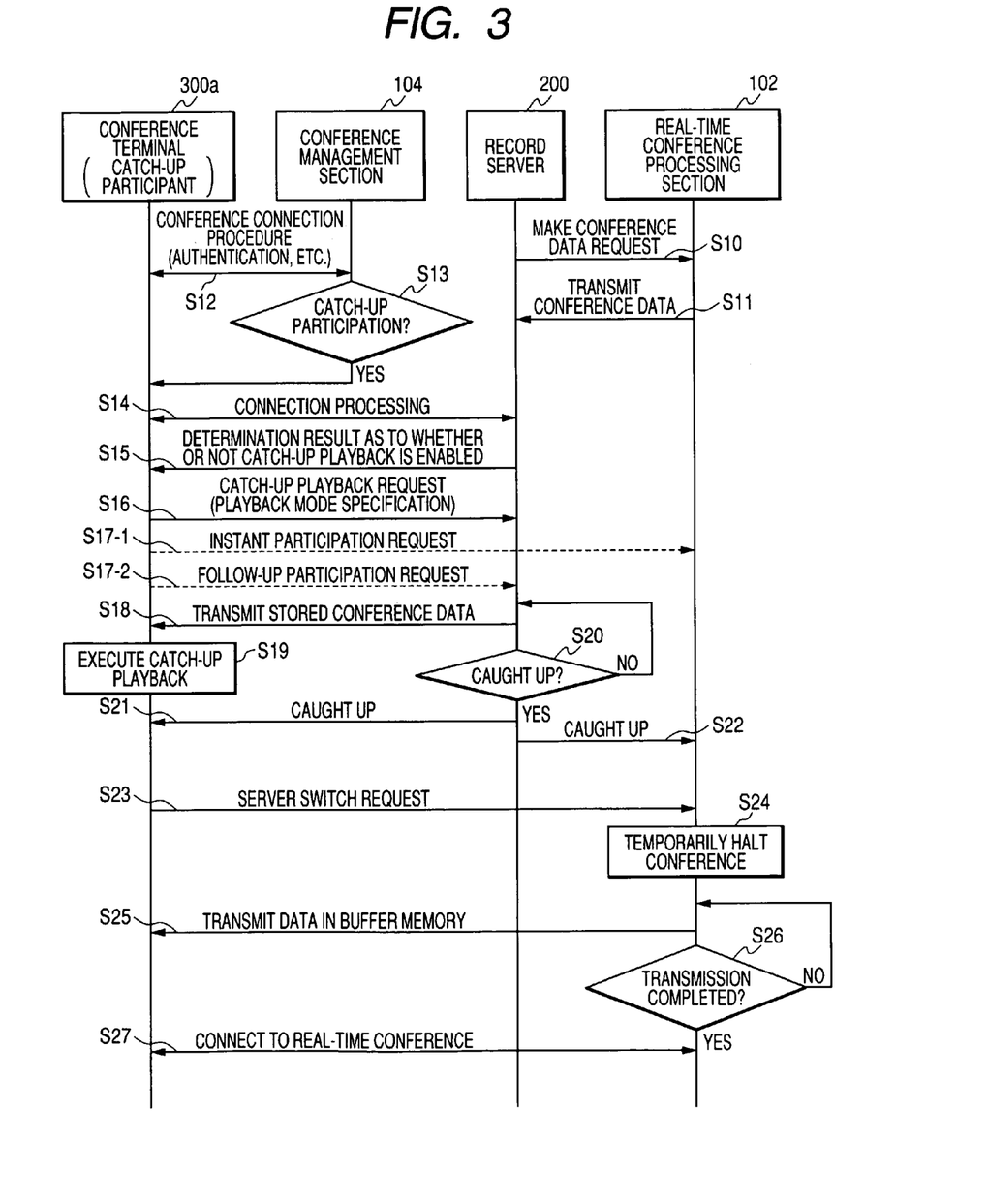
FIG. 3 is a flowchart to describe data and control information transfer procedures among a conference terminal, a conference management section of a conference server, a record server, and a real-time conference processing section of the conference server in the network conference system in FIG. 2.

FIG. 3 is a flowchart to describe data and control information transfer procedures among the conference terminal, the conference management section of the conference server, the record server, and the real-time conference processing section of the conference server in the network conference system in FIG. 2.

If a late-joining participant exists in the conference participants, the real-time conference is started as planed. The record server 200 requests the real-time conference processing section 102 in the conference server 100 to transmit conference data (S10).

The real-time conference processing section 102 transmits the conference data on and after the point in time at which the promoter of the conference connected to the real-time conference to the record server 200 (S11)

On the other hand, the conference terminal 300a of the late-joining participant accesses the conference management section 104 in the conference server 100 and conducts a connection procedure to the real-time conference (authentication, etc.,) (S10).

Subsequently, the conference management section 104 determines whether or not the connected participant wants catch-up participation (S11). If the participant wants catch-up participation, connection to the real-time conference is not made.

The conference terminal 300a performs connection processing to the record server 200 (S14). The record server 200 determines whether or not catch-up participation is enabled, and sends the determination result to the conference terminal 300a (S15).

Upon reception of the notification that catch-up participation is enabled, the conference terminal 300a transmits a catch-up playback request (request to transmit high-speed played-back conference data) to the record server 200 (S16).

Upon reception of the notification that catch-up participation is not enabled, the conference terminal 300a can select either accessing the real-time conference processing section 102 in the conference server 100 and making a request for taking part in the real-time conference (S17-1) or accessing the record server 200 and making a follow-up playback (namely, participation as an observer only viewing the past conference data) request (S17-2).

To execute catch-up playback, the record server 200 plays back the stored conference data at high speed and transmits the played-back data to the conference terminal 300a.

In the conference terminal 300a, the video and audio of the past conference are reproduced based on the sent high-speed played-back data, whereby catch-up playback is executed (S19).

On the other hand, the record server 200 makes a catch-up determination (S20) and when catch-up is detected (at the termination of the catch-up playback), the record server 200 notifies the conference terminal 300a and the real-time conference processing section 102 that the catch-up playback has reached the end (S21 and S22).

The conference terminal 300a transmits a request for switching the connection from the record server 200 to the conference server 100 (server switch request) to the real-time conference processing section 102 in the conference server 100 (S23).

The real-time conference processing section 102 in the conference server 100 temporarily halts the real-time conference (S24) and meanwhile transmits the conference data stored in the buffer memory 108 to the conference terminal 300a (S25).

Upon detection of completion of the transmission (S26), the real-time conference processing section 102 releases the temporary halt of the real-time conference and restarts distributing the real-time conference data, thereby accomplishing connection of the conference terminal 300a to the real-time conference (S27). It is also possible to perform seamless server switching as described above.

Thus, the network conference system of the embodiment enables the participant late for the real-time conference to reference and keep track of the past conference description using the catch-up participation function before taking part in the current proceeding conference.

That is, hitherto, the late-joining participant has been able only to take part directly in a real-time conference without being aware of the past conference description; however, the network conference system of the embodiment enables the participant to select any other participation mode such as catch-up participation.

Figure 4:
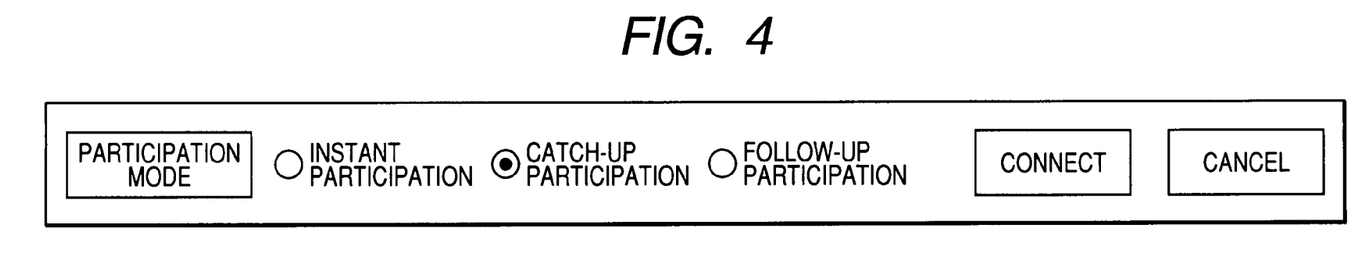
FIG. 4 is a drawing to show an example of a conference participation mode selection screen displayed on the conference terminal of a catch-up participant.

FIG. 4 is a drawing to show an example of a conference participation mode selection screen displayed on the conference terminal of the catch-up participant.

As shown in the figure, as the participation mode, not only instant participation in a real-time conference, but also catch-up participation and follow-up participation (participation as an observer only viewing the past conference description) are available and the participant can select any participation mode. Therefore, the ease-of-use of the network conference system is improved.

Figure 5:
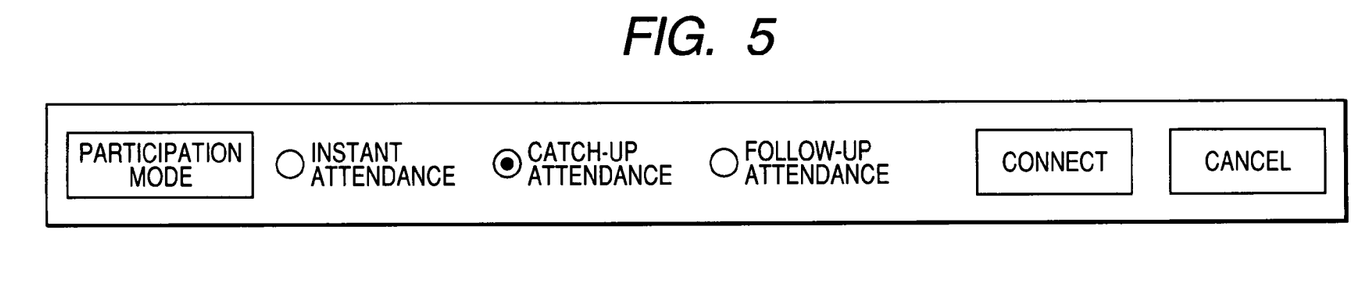
FIG. 5 is a drawing to show another example of a conference participation mode selection screen displayed on the conference terminal of a catch-up participant.

FIG. 5 is a drawing to show another example of a conference participation mode selection screen displayed on the conference terminal of the catch-up participant.

The example in FIG. 5 assumes participation in a audio-only conference as an observer, wherein the participant can select the participation mode from among instant attendance, catch-up attendance, and follow-up attendance.

The invention is not limited to the embodiments described above and various modifications of the invention can be made.

For example, in the embodiments, each conference terminal connects to the conference server and the record server using the Web browser, but a dedicated application may be used. An application operating on the Web browser may be used without stating the conference client application from the Web browser.

To make conference connection, a mode of distributing the URL for conference to each client may be adopted instead of the password entry mode. Alternatively, it is also possible to previously register participants when a conference is reserved and enter the login user ID for automatically connecting to the reserved conference.

If a catch-up participant occurs, existence of a catch-up participant may be indicated in such a manner that a message of "a user "***" (name, etc.,) is in catch-up participation" is displayed on the conference terminals of the participants in the current proceeding conference.

As the past conference data is played back at uniform speed, follow-up conference participation is also possible, as described above. For follow-up participation, the conference terminal connects only to the record server from the beginning to the end of the conference and connection switching to the conference server is not performed. Therefore, the user of the conference terminal takes part in the conference as an observer.

As described above, in the embodiments, the participant late for the real-time conference can reference and keep track of the past conference description using the catch-up participation (catch-up playback) function before taking part in the current proceeding conference. Accordingly, the late-joining user does not become disadvantageous and it is also made possible for the late-joining user to actively take part in the conference.

If catch-up participation (catch-up playback) is not enabled, the user can select either participation in the conference as an observer using the catch-up playback mode or direct participation in the current proceeding conference, and the number of options for the user is increased. The options are displayed on the display of the conference terminal, whereby the user interface can also be diversified. Accordingly, the ease-of-use of the network conference system is improved.

Since the real-time conference can be started without waiting for a late-joining user, the time is not wasted. If the late-joining user takes part in the conference midway, the chairperson, etc., need not describe the past details for the late-joining user, making it possible to advance the conference efficiently.

The conference data stored in the record server (multimedia data) serves as the minutes of the conference. Therefore, it is also possible to reference the minutes of the conference as the conference terminal connects to the record server after the conference is over.

As described above, the network conference system of each embodiment described above includes the conference server 100 for managing a conference and processing conference data in a real-time conference, the record server 200 having the functions of storing the conference data in the real-time conference and playing back the stored conference data at variable speed, and a plurality of conference terminals 300a to 300d as clients that can use the conference server 100 and the record server 200, wherein the (catch-up participation) conference terminal 300a can connect to the record server 200 and receive distribution of the past conference data in the real-time conference played back at high speed or at uniform speed from the record server 200.

Accordingly, it is made possible for the late-joining user to keep track of the past conference description without hindering the progress of the real-time conference, and the network conference system which is more convenient and is improved in ease of use can be provided.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A network conference system comprising:
a conference server that manages a conference and processes conference data used for a real-time conference;
a record server that stores the conference data in a storage section and plays back the conference data stored in the storage section at variable speed; and
a plurality of conference terminals as clients connected to the conference server and the record server to be serviced therefrom,
wherein the system further comprises a catch-up participation function in which when a conference terminal among the plurality of conference terminals takes part in a conference midway, the conference terminal is connected to the record server, the conference data stored in the record server is played back at high speed until the conference terminal catches up with the current conference, and when the conference terminal catches up with the current conference, the conference terminal is connected to the conference server for taking part in the real-time conference,
wherein the conference server adds a time stamp to the conference data and transmits the conference data to the record server,
wherein the record server stores the conference data transmitted from the conference server and upon reception of a catch-up participation request from the conference terminal, determines whether or not catch-up participation is enabled, plays back the stored conference data at high speed, transmits the played back conference data to the conference terminal, determines an end point of catch-up playback by comparing the time stamp contained in the conference data and the current time of day, and when the end point comes, notifies the conference terminal and the conference server that the catch-up playback reaches the end point, and wherein the conference terminal, upon reception, from the record server, of the notification that the catch-up playback reaches the end point, switches connection from the record server to the conference server and takes part in the real-time conference.

2. The network conference system as claimed in claim 1, wherein the record server detects a no-input portion of an audio and skips to play back the conference data at the no-input portion when the record server plays back the stored conference data at high speed.

3. The network conference system as claimed in claim 1, wherein a playback speed is allowed to be specified from the conference terminal when the record server plays back the stored conference data at high speed.

4. The network conference system as claimed in claim 1, wherein the record server determines whether or not catch-up participation is enabled upon reception of a catch-up participation request from the conference terminal, estimates the remaining time of the real-time conference at the end point of the catch-up playback from the remaining time of the conference at the current point in time, and a time required by the time the catch-up playback ends, and wherein when the estimated remaining time is equal to or greater than a predetermined time, the record server determines that catch-up participation is enabled.

5. The network conference system as claimed in claim 1, wherein after a predetermined-time delay of the conference data to which the time stamp is added, the conference server transmits the conference data to the record server, wherein the record server compares the time stamp contained in the conference data and the current time of day, determines that the end point of the catch-up playback comes when the time indicated by the time stamp is the time the predetermined time before the current time, and notifies the conference terminal and the conference server that the catch-up playback reaches the end, and wherein upon reception of the notification, the conference server sends the notification at least to the catch-up conference terminal and then temporarily halts the real-time conference and transmits the conference data delayed for the predetermined time to the conference terminal connected to the conference server to take part in the real-time conference and then releases the temporary halt and transmits the conference data of the real-time conference to said conference terminal to enable the conference terminal to take part in the real-time conference.

6. The network conference system as claimed in claim 1, wherein after a predetermined-time delay of the conference data to which the time stamp is added, the conference server transmits the conference data to the record server, wherein the record server compares the time stamp contained in the conference data and the current time of day, and when the time indicated by the time stamp is the time the predetermined time before the current time, the record server determines that the end point of the catch-up playback comes, and notifies the conference terminal and the conference server that the catch-up playback reaches the end, and wherein upon reception of the notification, the conference server transmits the conference data delayed for the predetermined time to the conference terminal connected to the conference server to take part in the real-time conference and in transmitting the conference data, transmits the conference data at a higher transmission rate at the beginning and decreases the transmission rate with time and sets the transmission rate to usual transmission rate at the completion of transmission of the conference data for the predetermined time and conference data occurring during the transmission of the conference data for the predetermined time to accomplish seamless participation of the conference terminal in the real-time conference.

7. The network conference system as claimed in claim 1, wherein when the record server stores the conference data of the real-time conference in the storage section, the record server divides the conference data every predetermined amount of data to create a file.

8. The network conference system as claimed in claim 1, wherein when the record server determines that the catch-up participation is not enabled as the determination result as to whether or not catch-up participation is enabled, the conference terminal selects one from connecting to the conference server and taking part in the real-time conference and receiving distribution of the past conference data played back at uniform speed or high speed.

9. A conference server having a catch-up participation processing function used with the network conference system as claimed in claim 1.

10. A record server having functions of storing conference data of a real-time conference and high-speed or uniform-speed playback of the stored conference data, used with the network conference system as claimed in claim 1.

11. The record server as claimed in claim 10 further having a determination function as to whether or not catch-up participation is enabled, a catch-up playback end point determination function, and a function of notifying the conference terminal and the conference server that the end point has come.

12. A conference terminal having a function of controlling connection to the conference server and the record server, used with the network conference system as claimed in claim 1.

* * * * *